Oct. 5, 1965 SEIICHI YOSHIZAWA ETAL 3,210,562

SYNCHRONOUS DELAY AMPLIFIER EMPLOYING PLURAL BIAS AND CLOCK PULSE SOURCES

Filed June 20, 1961

2 Sheets-Sheet 1

INVENTORS
SEIICHI YOSHIZAWA
AKIRA KOBAYASHI

BY

OSTROLENK, FABER, GERB & SOFFEN
ATTORNEYS

INVENTORS
SEIICHI YOSHIZAWA
AKIRA KOBAYASHI
BY
OSTROLENK, FABER, GERB & SOFFEN
ATTORNEYS

United States Patent Office 3,210,562

Patented Oct. 5, 1965

3,210,562

SYNCHRONOUS DELAY AMPLIFIER EMPLOYING PLURAL BIAS AND CLOCK PULSE SOURCES

Seiichi Yoshizawa and Akira Kobayashi, both of Tokyo, Japan, assignors to Nippon Electric Company, Limited, Tokyo, Japan Filed June 20, 1961, Ser. No. 118,391
Claims priority, application Japan, June 21, 1960, 35/29,015
5 Claims. (Cl. 307—88.5)

Our invention relates to a delay circuit and more particularly to a synchronous delay circuit having a hysteresis characteristic for placing binary information signals impressed upon the input of the delay circuit in phase with the synchronous delay circuit clock pulse.

A synchronous type arithmetic circuit widely used in computer circuitry is normally composed of logic gates for providing logic operations and synchronous delay amplifiers for reshaping logic gate output signals to signals which are synchronised with a clock signal. This invention relates to such synchronous delay amplifiers.

In high speed electronic circuits, such as those employed in digital computers, it is necessary to maintain the binary coded data introduced into the circuitry in proper phase at all times since a time delay shift in a data binary pulse train of data will shift the binary word a full bit position out of phase resulting in a severe modification in the magnitude of the binary coded word.

In computers of the synchronous type the function of synchronization is presently performed by providing a highly stable clock pulse source which gates the computer logical circuitry by inhibiting an output of a logical circuit in the absence of a clock pulse. This arrangement, however, requires logical circuit to include the clock pulse input as one of the logical inputs in order that synchronism be maintained thus complicating each logical circuit which comprise the computer. Also the logical circuit introduces its own delay thus failing to completely correct the delay introduced.

The circuit of our invention synchronizes the binary data pulses by employing a separate circuit thus avoiding the necessity of altering the circuits employed for performing the logical operations. The delay amplifier of the invention may further be employed as a means to delay a binary data pulse a full half period of the clock pulse cycle.

Our invention is comprised of a bistable circuit exhibiting hysteresis characteristics which responds to the binary input signal as an amplifier having no hysteresis characteristic, the suppression of the hysteresis characteristic being carried out by inhibiting the positive feedback of the bistable circuit during a first portion of the clock pulse cycle. The hysteresis characteristic of the bistable circuit is restored during a second portion of the clock cycle by restoring the positive feedback of the bistable circuit. The bistable circuit, due to its conductive state at the instant that the positive feedback characteristic is restored, retains its conductive state as a result of the hysteresis characteristic.

These functions are performed by the clock pulse source which inhibits the positive feedback of the bistacle circuit during that portion of the cycle which the input signal is impressed upon the input of the bistable circuit and which suppresses any binary data input signal during the succeeding portion of the clock pulse cycle while restoring the positive feedback to maintain the bistable circuit in its present conductive state throughout the said succeeding portion of the cycle.

The synchronous delay amplifier according to this invention is composed of a common-emitter type bistable circuit as the basic circuit, to which is annexed a first control circuit which inhibits the positive feedback action of said bistable circuit during an interval in one clock period [hereinafter referred to as the switching period], suppressing the hysteresis characteristic possessed by said bitable circuit, in order to amplify the input signal for operating said bistable circuit simply as a common-emitter type D.C. amplifier and a second control circuit which checks the input signal from entering into said bistable circuit during other than the above-mentioned interval in one clock period [hereinafter referred to as the holding period] and operates so as to fix the input terminal of said bistable circuit to a constant potential during the holding period.

By annexing the first control circuit and thereby suppressing the hysteresis characteristic of the bistable circuit during the switching period, some outstanding features can be accomplished such as marked improvements in switching sensitivity, reduction in amplitude of the input signal necessary for switching as compared to the amplitude of the input signal in the absence of said control circuit, and improvements in switching speed.

During the first portion of the cycle when the positive feedback is inhibited, the bistable circuit acts as an amplifier which is responsive to signals of small amplitude, when the positive feedback has been restored during the second portion of the clock pulse cycle.

An amplifier stage is provided between the input of the synchronous delay amplifier and the bistable circuit which serves to amplify the incoming binary signal which shortens the response time of the bistable circuit.

Due to the manner in which the clock pulse source is employed in the synchronous amplifier there is no need to impress a reset signal upon the input of the synchronous delay amplifier since the positive feedback is suppressed during the time the binary input signal is impressed on the input terminal.

In logical circuit applications wherein it is necesssary to connect synchronous delay amplifiers in a cascade arrangement a matching circuit is provided which enables direct coupling to a logical circuit having an output level comparable to the output level of the synchronous delay amplifier, but which differs from the input voltage level of the synchronous delay amplifier.

It is therefore an object of our invention to provide a novel synchronous delay amplifier which is comprised of a bistable circuit which is so designed to have its hysteresis characteristic suppressed during the time at which the input signal is received.

Another object of our invention is to provide a novel synchronous delay amplifier having a regular clock pulse cycle which has a novel arrangement for inhibiting the input signal during a portion of the clock pulse cycle for synchronizing the input signal with the clock pulse.

Another object of our invention is to provide a novel synchronous delay amplifier circuit having an amplifier means for accepting an input signal of small ampitude for shortening the response time of the synchronous delay amplifier.

Still another object of our invention is to provide a novel synchronous delay amplifier circuit which is so designed as to receive an input signal having a voltage level different from that of the bistable circuit of the delay amplifier.

An object of this invention is to provide a novel type synchronous delay amplifier adapted for use in a synchronous arithmetic circuit capable of switching at a high speed with the input signal being of small amplitude by suppressing the hysteresis characteristic of the common-emitter type distable circuit during the switching period.

Another object of this invention is to provide a novel type synchronous delay amplifier of the NRZ [Non Return to Zero] signal system adapted for composition of a high-speed arithmetic circuit.

These and other objects of the invention will be best understood from the following description of exemplifications thereof, reference being made to the accompanying drawings, wherein.

Figure 1:
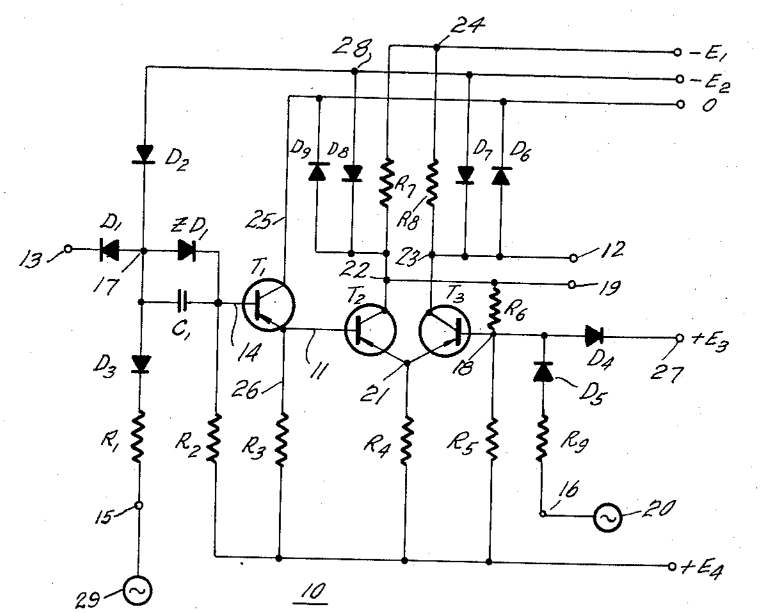
FIG. 1 is a schematic diagram of our novel synchronous delay amplifier.

Referring now to the drawings, FIG. 1 shows our novel synchronous delay amplifier 10 having a bistable circuit which is comprised of transistors T2 and T3 which are of the PNP type. The emitters of transistors T2 and T3 are connected at point 21 to one end of resistor R4, the other end of which is connected to D.C. bias +E4. The collector 22 of transistor T2 is connected to the base 18 of transistor T3 by means of resistor R6, thus establishing the positive feedback path of the bistable circuit. The collectors 22 and 23 of transistors T2 and T3 are connected to a negative D.C. bias —E1 at terminal 24 by resistors R7 and R8, respectively. The ouput of the bistable circuit is clamped between voltage levels —E2 and 0 (i.e., ground potential), by means of diodes D8–D7 and D9–D6 respectively. The ouput of the bistable circuit is normally taken from terminal 12 which is directly connected to the collector 23 of transistor T3. The output may also be taken from terminal 19 which is directly connected to the collector 22 of transistor T2.

The parameters of the bistable circuit are chosen so as to produce an output voltage of either —E2 or 0 volts depending upon the input to the bistable circuit.

The circuit composed of $T_2$, $T_3$, $R_4$, $R_5$, $R_6$, $D_6$, $D_7$, $D_8$ and $D_9$ is known as the common emitter bistable circuit. It is known that this circuit is possessed of a memory function and the input voltage vs. output voltage curve depicted with terminal 11 and terminal 12 identified respectively as the input and output terminals manifests the hysteresis characteristic.

Now let it be required to consider one case in which $T_2$ has become conducting and $T_3$ non-conducting. The voltage on collector 22 of $T_2$ is approximately at ground potential by the limiting action of $D_9$ while the voltage on collector 23 of $T_3$ becomes approximately equal to $-E_2$ by the voltage limiting action of $D_7$. The voltage on the base of $T_3$ or that at terminal 18 becomes equal to $E_4R_6/[R_5+R_6]$ according to Ohm's law.

In the next place, consider the opposite state under which $T_2$ and $T_3$ have become non-conducting and conducting, respectively. Then the voltage on collector 22 of $T_2$ becomes $-E_2$ while that on collector 23 of $T_3$ becomes equal to ground potential. In this case, the base voltage of $T_3$ is expressed as $$[E_4R_6-E_2R_5]/[R_5+R_6]$$

Figure 3:
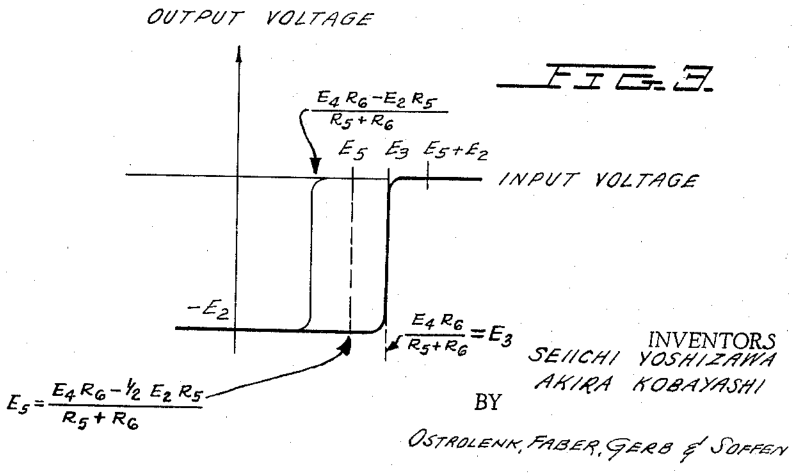
FIG. 3 is a plot of the hysteresis characteristic of the bistable amplifier circuit included in the synchronous delay amplifier of FIG. 1.

Therefore in order that switching may take place in the aforementioned circuit from a state under which $T_2$ is conducting and $T_3$ is non-conducting to the opposite state, there is the necessity that the input voltage to base 11 of $T_2$ be higher than the base voltage $E_4R_6/[R_5+R_6]$ of $T_3$ under this condition. On the other hand, in order that the opposite state may be accomplished from the state in which $T_3$ is conducting and $T_2$ is non-conducting, it is a necessary condition that the voltage on base 11 of $T_2$ be lower than the base voltage $$[E_4R_6-E_2R_5]/[R_5+R_6]$$

of $T_3$ under the condition. FIGURE 3 shows the input voltage vs. output voltage curve as depicted by taking base 11 of $T_2$ as the input terminal and collector 23 of $T_3$ as the output terminal. The input terminal which is base 11 of transistor T2 is not, however, designed so as to receive an input signal of the same voltage level as the output voltage level of the bistable circuit. In order that the bistable circuit of FIG. 1 may be flexible enough to utilize in cascade arrangements, as will be more fully described, a voltage matching circuit which is comprised of zener diode ZD1 and capacitor C1, which are connected in parallel between terminals 17 and 14. The capacitor C1 is connected to D.C. supply voltage +E4 through resistor R2. The input terminal 13 is arranged so as to accept binary input signals having voltage levels between —E2 and 0 or ground potential wherein ground potential represents binary "0" and the —E2 voltage level represents binary "1."

The zener diode $ZD_1$ is for shifting the input signal voltage level and capacitor $C_1$ is inserted to lower the HF impedance of $ZD_1$ equivalently. Use must be made of such a zener diode as $ZD_1$ whose zener voltage is $E_2+[E_4R_6-\frac{1}{2}E_2R_5]/[R_5+R_6]$.

Then, when the voltage at the terminal 17, is equal to $-E_2$, the voltage on base 11 of $T_2$ [which may be considered to be equal to the voltage on base 14 of $T_1$] becomes $[E_4R_6-\frac{1}{2}E_2R_5]$, or the abscissa corresponding to the center of the hysteresis loop shown in FIGURE 3.

When the terminal 17 is at ground potential, the voltage at base 11 of $T_2$ becomes $E_2+[E_4R_6-\frac{1}{2}E_2R_5]/R_5+R_6$, which is higher than the voltage $E_4R_6/[R_5+R_6]$ at the corner of the heavy line in FIGURE 3.

A transistor T1 is employed between the bistable circuit and the voltage matching circuit which transistor is so arranged as to serve as an impedance matching current amplifier between the aforesaid bistable circuit and the voltage matching circuit. Transistor T1 which is of the PNP type, has its collector 25 directly connected to ground potential while its emitter 26 is connected to D.C. supply +E4 to resistor R3. The voltage matching circuit is connected to the base 14 of transistor T1 while the output is taken from the emitter 26 which is directly connected to the base 11 of transistor T2.

Figure 2:
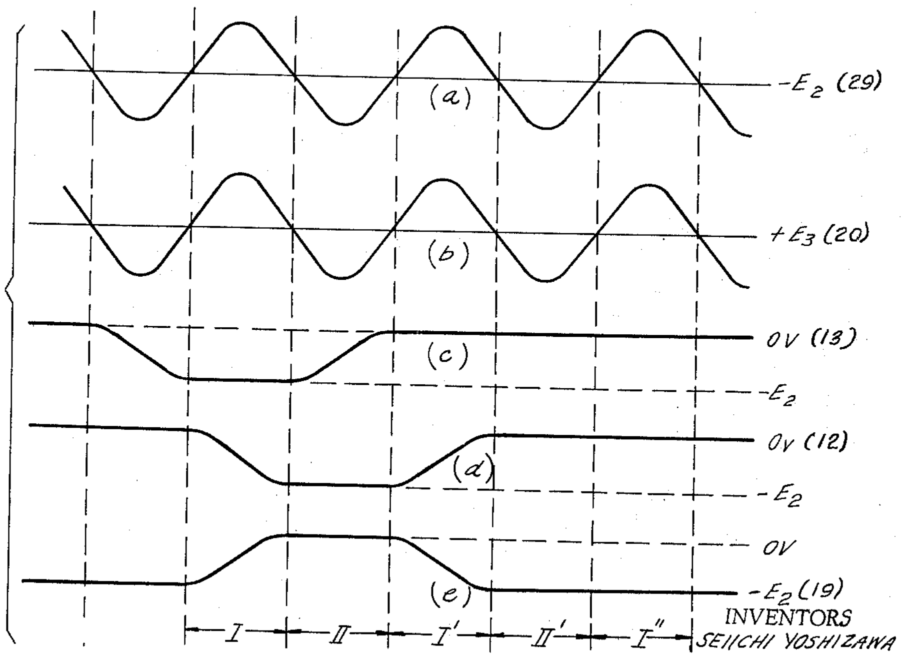
FIG. 2 is a diagram showing the input, output and clock pulse waveforms of the synchronous delay amplifier of FIG. 1.

Diodes D4 and D5 have their anode and cathode, respectively, connected to the base 18 of transistor T3 while the cathode of diode D4 is connected to D.C. bias +E3 which is equal to $E_4R_6/[R_5+R_6]$ and the anode of diode D5 is conected to a clock signal source 20 for generating a clock signal as shown in FIGURE 2(*b*) through resistor R9. Let the circuit composed of $D_4$, $D_5$ and $R_9$ be called the first control circuit. This configuration acts to suppress the positive feedback voltage of the bistable circuit as will be more fully described. The clock signal source 29 for generating a clock signal as shown in FIGURE 2(*a*) is connected to the cathode of diode D3 through a resistor R1, the anode of diode D3 being connected to terminal 17 which is likewise connected to the anode and cathode of diodes D1 and D2 respectively. The anode of diode D2 is connected to D.C. bias —E2, while the cathode of diode D1 is provided to receive the binary input signals. Let the circuit composed of $D_1$, $D_2$, $D_3$ and $R_1$ be called the second control circuit. The configuration comprised of diodes D1 through D3 and clock signal source 29 is so arranged as to prevent the transfer of the input signal from terminal 13 to terminal 17 during a portion of the clock signal cycle as will be more fully described. The clock signal source which is impressed upon terminals 15 and 16 of waveforms (*a*) and (*b*) which are shown in FIG. 2 wherein it can be seen that the clock signal waveform impressed upon terminal 15 is with a D.C. voltage level —E2, while the waveform (*b*) impressed upon terminal 16 is combined with a positive D.C. voltage level +E3 as mentioned previously for purposes to be more fully described. It should be noted that the amplitude of the clock pulse waveform is considerably larger (several times) than the amplitude of the bistable circuit output voltage which lies between the limits 0 volts to —E2 volts.

The operation of the circuit when the input shown by waveform (*c*) og FIG. 2 is impressed upon the input terminal 13 is as follows:

In the period I in FIG. 2 the composite waveform (*a*) impressed upon terminal 15 places the cathode of diode D3 at a more positive voltage level than the anode voltage of diode D2 which is clamped at —E2 volts, thus preventing conduction through either diodes D2 or D3. Consequently, the voltage at terminal 17 will be —E2 volts which is determined by the input voltage at terminal 13 (see waveform (*c*) of FIG. 2) which is at —E2 volts during the period I, thereby representing an input signal of binary "1." The voltage on the base 14 of transistor T1 becomes $[E_4R_6-\frac{1}{2}E_2R_5]/[R_5+R_6]$ due to the action of the zener diode ZD1 and capacitor C1 combination, as above explained.

At this instant the composite waveform (see waveform *b* of FIG. 2) impressed upon terminal 16 places terminal 16 at a more positive voltage than terminal 27 which is connected to biased voltage +E3, thus causing diodes D4 and D5 to become highly conductive and to clamp the voltage at terminal 18 at the voltage level of +E3 volts. Consequently the positive signal fed back from collector 22 of transistor $T_2$ to base 18 of transistor $T_3$ through resistor $R_6$ is suppressed. The bistable circuit under these conditions acts as a common emitter amplifier capable of switching by use of a signal impressed on terminal 11. As has been mentioned, $+E_3$ is selected to be $E_4R_6/[R_5+R_6]$. Under this condition the voltage on base 11 of $T_2$ is lower than that on base 18 of $T_3$. Thus the bias current that flows in $R_4$ will flow through $T_2$. In other words, $T_2$ becomes conducting and $T_3$ nonconducting. Therefore the voltage on collector 22 of $T_2$, or that at output terminal 19, is reduced to ground potential, while the voltage at collector 23 of $T_3$, or that at output terminal 12 becomes equal to $-E_2$.

FIGURE 2(*d*) shows the voltage waveform at output terminal 12 and FIGURE 2(*e*) shows that at terminal 19. It will be understood that the reason why transients are depicted in the waveforms of FIGURES 2(*d*) and (*e*) during period I is that switching performed by $T_2$ and $T_3$ is not instantaneous in character as a matter of fact, requiring a certain time interval before perfect switching is achieved.

In the period II the composite waveform impressed upon terminal 15 places terminal 15 at a more negative level than terminal 28, causing diodes D2 and D3 to become highly conductive thus clamping the voltage of terminal 17 at —E2 volts. Terminal 17 will remain clamped at —E2 volts regardless of the signal impressed upon input terminal 13. Consequently, the voltage at the base 14 and at the base 11 of transistors T1 and T2 respectively will be fixed at the voltage level of $$[E_4R_6-\frac{1}{2}E_2R_5]/[R_5+R_6]$$

volts due to the operation of the zener diode ZD1 as was previously described.

Concurrently with this operation the voltage level at point 16 becomes more negative than the voltage level at point 27 thus placing diodes D4 and D5 in the nonconductive state. As a result of this the positive feedback path between collector 22 and base 18 of transistors T2 and T3 respectively is no longer suppressed or clamped at the voltage level +E3. The voltage level at the collector 23 of transistor T3 however remains at the —E2 volts level due to the restoration of the hysteresis characteristic of the bistable amplifier and remains at the —E2 level throughout period II.

In the next period I' the same operation as was performed in I is repeated. However, since the voltage at the input terminal 13 is at ground or 0 potential (see FIG. 2 waveform (*c*) the voltage at the base 11 of transistor 2 rises to $E_2+[E_4R_6-\frac{1}{2}E_2R_5]/[R_5+R_6]$ causing transistor $T_2$ to become conducting. This causes the voltage at terminal 12 to become ground potential and that at terminal 19 to become $-E_2$ as shown in FIGURES 3(*d*) and (*e*).

During the period II' the hysteresis characteristic of the bistable circuits are restored the same as during the period II, the voltage at terminal 17 becoming $-E_2$—that is, the voltage on base 11 of $T_2$ being fixed to a value $[E_4R_6-\frac{1}{2}E_2R_5]/[R_5+R_6]$.

Since this value is equal to the abscissa corresponding to the center of the hysteresis loop of the bistable circuit, switching will never be effected in the bistable circuit in this period during which the hysteresis characteristic is unsuppressed. Thus the output voltage sustains switched-over conditions during the period I'.

From the foregoing the function of the synchronous delay amplifier may be summed up as deriving a signal which has been delayed one-half period by amplification and rectification of an input signal such that a clock signal may produce reversal of a signal voltage in the negative half period and sustain a constant signal voltage in the positive half period. A complement signal to the signal from terminal 12 may be from terminal 19.

As will be realized from the foregoing description, the hysteresis characteristic of the bistable circuit is suppressed during the switching period [I or I'], with the result that the switching sensitivity of said circuit during said period is improved markedly, featuring ease of response for a small input signal. Further, since the output signal of this synchronous delay amplifier is of the so-called NRZ type in which —$E_2$'s or 0V's succeed as a D.C. voltage for the output signal where 1's or 0's succeed as the input signal, the delay amplifier circuit is highly adapted for use in a high-speed arithmetic circuit.

It will also be understood from the foregoing that reversal of the input signal needs only be accomplished within a half period of the clock signal and hence, the requirements for the reversal time interval for the input signal do not become so stringent.

Figure 4:
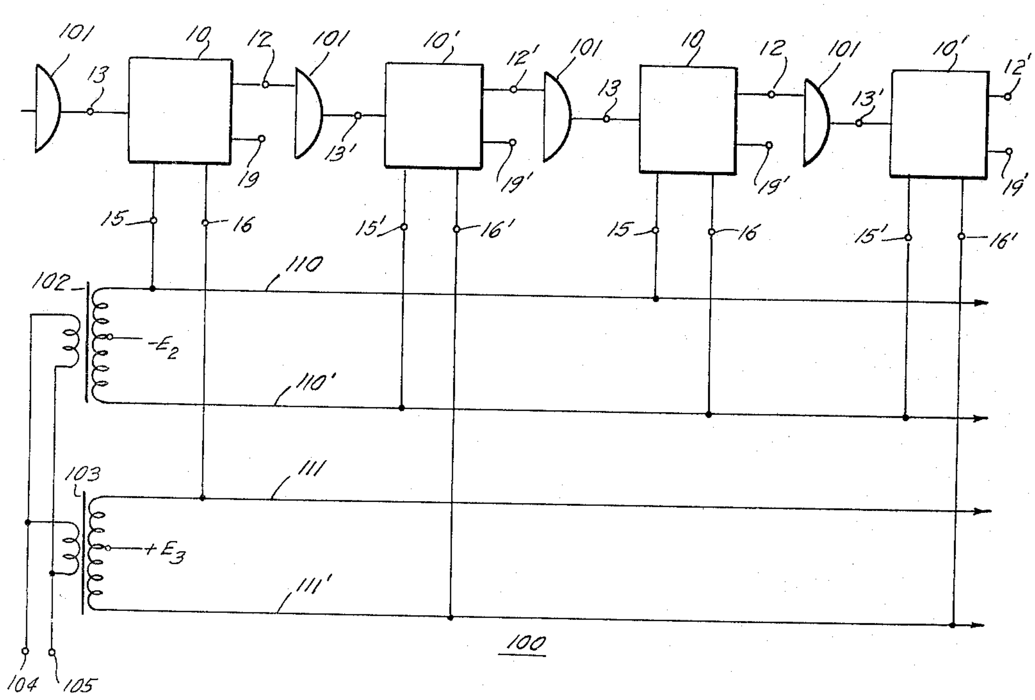
FIG. 4 is a circuit diagram, partially in diagrammatic form, of a plurality of synchronous delay amplifiers connected in a cascade arrangement.

FIG. 4 shows the schematic diagram of an embodiment of a logical operating circuit 100 composed of a plurality 10 and 10' of the synchronous delay amplifiers and a plurality of logical operating elements 101. The logical operating elements may be of any type presently in use such as AND gates, OR gates, EXCLUSIVE-OR gates or any other well known logic circuit. The blocks 10 and 10' diagrammatically represent the synchronous delay amplifiers of the instant application and the terminals 12, 13, 15, 16 and 19 correspond to the like terminals of FIG. 1.

In order to obtain the clock pulses 20 which are biased in the proper manner, transformers 102 and 103 are employed. The D.-C. bias levels —E2 and +E3 are appropriately impressed at the mid points 106 and 107 of the secondary windings of transformers 102 and 103 respectively. A sinusoidal voltage is applied to the terminals 104 and 105 which are connected to the input windings of transformers 102 and 103 respectively. This arrangement provides the clock pulse required during the periods I and II from lines 110 and 111 respectively while the clock pulse during the periods I' and II' are obtained from lines 110' and 111' respectively.

Lines 110 and 111 are connected to the terminals 15 and 16 respectively of each delay amplifier 10 while lines 110' and 111' are connected to the terminals 15' and 16' of synchronous delay amplifiers 10'. With this arrangement the synchronous delay amplifiers 10 are conditioned to respond to the binary signals impressed upon their respective inputs while the synchronous delay amplifiers 10' are inhibited from responding to the binary signal at their inputs and are concurrently conditioned by the clock pulse sources 110' and 111' to maintain their present conductive state due to the restoration of their hysteresis characteristic.

Since the synchronous delay amplifiers 10 and 10' are arranged in an alternating fashion the output which the left hand most synchronous delay amplifier 10 maintains in specified half periods of the clock pulse cycle will be maintained by the adjacent synchronous delay amplifier 10' in the next half period of the clock pulse cycle, and the signal will be transferred through the circuit with the operation repeating itself in the same manner as previously described with respect to the synchronous delay amplifiers 10 and 10'.

The features and principles underlying the invention described above in connection with specific exemplifications thereof, will suggest to those skilled in the art many other modifications thereof. It is accordingly desired that the appended claims shall not be limited to any specific features or details described in connection with the exemplifications thereof.

We claim:

1. A synchronous delay amplifier for delaying a binary output signal comprising bistable circuit means having first and second inputs and an output terminal and having a hysteresis characteristic, a first clock signal source, first bias means, first diode means comprising a first diode connected between said second input of said bistable circuit means and said first bias means, a second diode connected between said second input of said bistable circuit means and said first clock signal source, a second clock signal source, a signal input terminal, second bias means having a potential level substantially different from said first bias means, second diode means comprising third and fourth diodes connected in series between the second bias potential and said second clock signal source, a fifth diode connected between the junction of said third and fourth series connected diodes and said signal input terminal, and circuit means for coupling a signal appearing at said junction to said bistable circuit first input, said bistable circuit being comprised of first and second transistors.

2. The delay amplifier of claim 1 wherein said circuit means is comprised of a zener diode coupled between said fifth diode and said first input terminal for shifting the voltage level of binary input signals.

3. The delay amplifier of claim 1 further comprising constant bias means, a common impedance element, the emitters of said first and second transistors being connected to said constant bias means through said common impedance element means wherein the common emitter impedance provides said bistable circuit with a hysteresis characteristic.

4. The delay amplifier of claim 3 further comprising amplifier means coupled between said second input and one of said transistors for receiving said binary input signals and impressing an amplified input signal upon the input of said bistable circuit for increasing the bistable circuit response time.

5. A synchronous delay amplifier comprising first and second transistors, a positive feedback path comprising impedance means connecting the collector of said first transistor to the base of said second transistor, first bias means, common impedance means, the emitters of said transistors being connected to one terminal of said common impedance means, the opposite terminal of said common impedance means being connected to said first bias means, first clock pulse generating means, second bias means, first and second unilateral impedance means connected between said clock pulse generating means and said second bias means; the junction between said first and second unilateral impedance means being coupled to the base of said second transistor and being responsive to said clock pulse source for suppressing said positive feedback path during a first portion of the clock pulse cycle, a second clock pulse source, third bias means having a potential substantially different from said second bias means, third and fourth unilateral impedance means connected between said second clock pulse means and said third bias means, the junction between said third and fourth unilateral impedance means being coupled to the base of said first transistor and being responsive to said second clock pulse source for clamping the base electrode of said first transistor during a second portion of said clock pulse cycle.

References Cited by the Examiner

UNITED STATES PATENTS

| | | | |
|---|---|---|---|
| 2,888,579 | 5/59 | Wanlass | 307—88.5 |
| 2,892,103 | 6/59 | Scarbrough | 307—88.5 |
| 2,918,586 | 12/59 | Curtis | 307—88.5 |
| 3,102,208 | 8/63 | Reach | 307—88.5 |

ARTHUR GAUSS, *Primary Examiner.*

JOHN W. HUCKERT, DAVID J. GALVIN, *Examiners.*